(No Model.)

J. H. McCONNELL.
FEATHER DRESSING MACHINE.

No. 527,619.     Patented Oct. 16, 1894.

Witnesses:
Fred Gerlach
Alberta Adamick

Inventor:
J. H. McConnell
By Prim & Fisher
Attorneys.

UNITED STATES PATENT OFFICE.

JAMES HOPPIN McCONNELL, OF CHICAGO, ILLINOIS.

FEATHER-DRESSING MACHINE.

SPECIFICATION forming part of Letters Patent No. 527,619, dated October 16, 1894.

Application filed January 22, 1894. Serial No. 497,641. (No model.)

*To all whom it may concern:*

Be it known that I, JAMES HOPPIN McCONNELL, a citizen of the United States, residing at Chicago, county of Cook, State of Illinois, have invented certain new and useful Improvements in Feather-Dressing Machines, of which I do declare the following to be a full, clear, and exact description, reference being had to the accompanying drawings, forming part of this specification.

In the manufacture of feather dusters from the feathers of domestic fowls, it is customary to split or cut away the under side or pithy portion of the stems of the feathers in order thereby to give increased elasticity and durability to the feather duster.

My present invention has for its object primarily to provide an improved machine whereby this cutting away or dressing of the pithy portion of the feather stems can be successfully and economically effected and this object of invention I have accomplished by the novel mechanism hereinafter described, illustrated in the accompanying drawings and particularly pointed out in the claims at the end of this specification.

Figure 1:
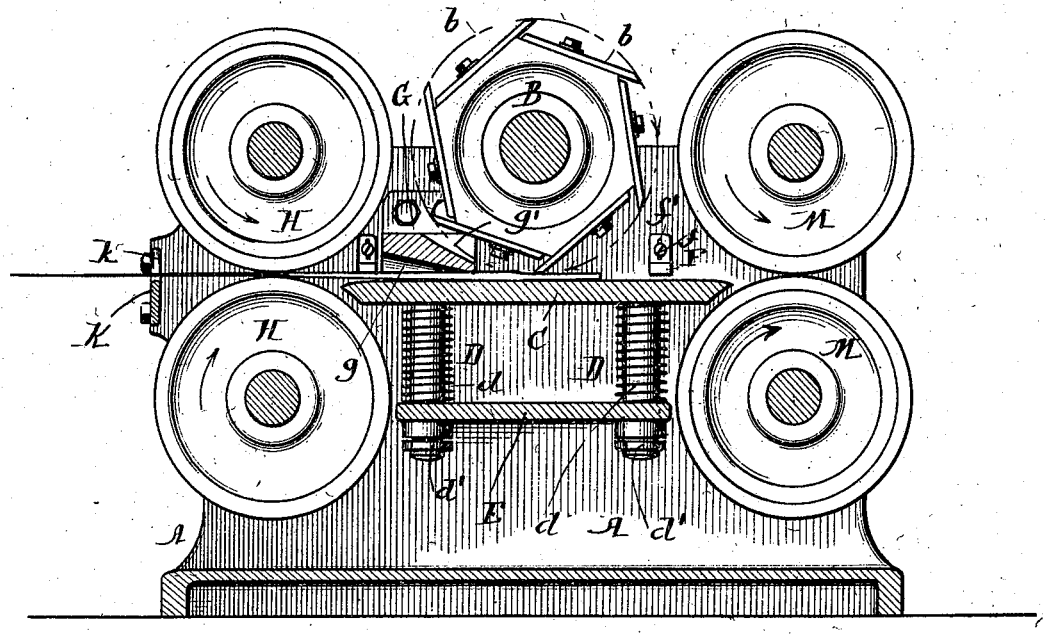
Figure 2:
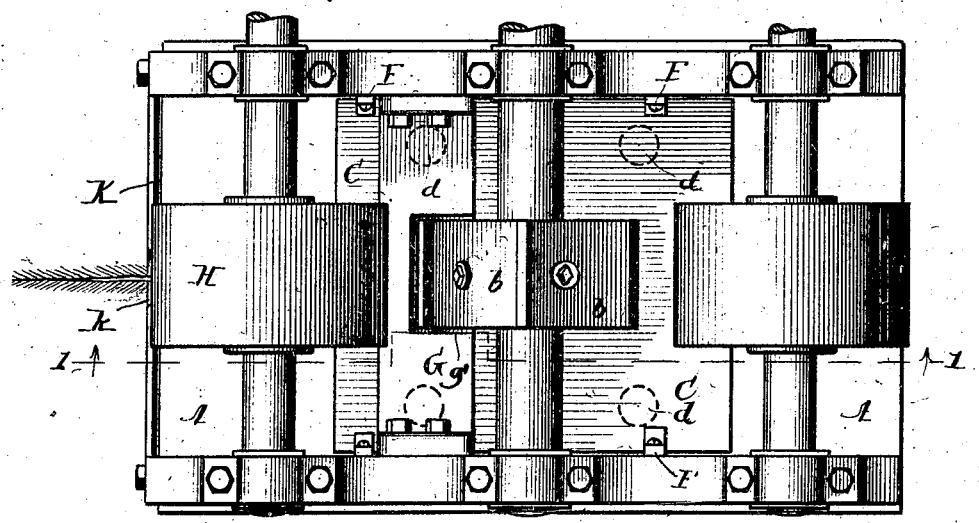
Figure 3:
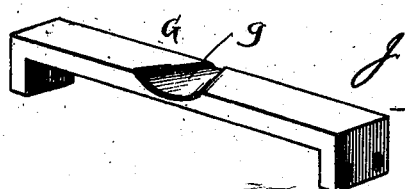

Figure 1 is a view in vertical longitudinal section through a machine embodying my invention, the section being taken on line 1—1 of Fig. 2. Fig. 2 is a plan view. Fig. 3 is a perspective view of the upper guide.

A designates the frame of the machine which may be of any suitable construction adapted to conveniently sustain the feed and delivery rolls, the rotary cutter head and other parts. The sides of the frame A sustain the rotary cutter head B that will be journaled in suitable bearings in manner well understood. This rotary cutter head B is provided with a series of knives *b* in suitable number and the cutter head will be driven so as to revolve in the direction of the arrow, Fig. 1,—that is to say, in direction opposite to the path of travel of the feathers as they pass through the machine. Beneath the cutter head B is the bed or table C whereon the feathers will rest as the knives *b* of the cutter head perform their work of cutting away the pithy portion of the stems.

The table C is a yielding table and by preference is mounted upon suitable springs D that encircle the guide rods *d*. The upper ends of the guide rods *d* are shown as attached to the under-side of the table C and as passing freely through the fixed support E and if desired these rods *d* may have their free ends threaded and provided with nuts *d'* whereby the extent of movement of the table C toward the cutter heads can be determined with exactness. It is manifest however, that instead of connecting the rods *d* to the table C, these rods might as well be fixed to the support E, in which case the upper ends of the rods *d* would pass freely through the table C and might be provided with nuts and weights to limit the upward movement of the table. If desired also, suitable stops F may be attached to the sides of the machine frame in order to determine the upward movement of the table; these stops F being preferably rendered adjustable by the screws *f* that pass through the slots *f'* of the stops.

My purpose in mounting the table C so that it will afford a yielding support for the feathers, as they are fed beneath the cutter head, is to insure that the proper amount shall be cut from the thin portion, as well as from the thick portion of the stems, as will presently more fully appear.

It is manifest that the table C may be rendered yielding in any other suitable manner, as for example by rubber springs instead of the coil springs, or by suitable weights serving to normally hold the table in its elevated position.

Above the yielding table C is mounted the upper guide G, the inner edge of which extends to a point adjacent the path of revolution of the cutting knives *b*. The under side of the guide G is provided with the tapering or bell-mouthed groove *g* that serves to accurately direct the feather into position to be operated upon by the knives *b* of the cutter head. If desired, this guide G may be adjustable although I do not regard this as essential. The upper face of the guide G is shown as cut away as at *g'* to avoid contact with the knives *b* of the cutter head.

In front of the cutter head B are journaled the feed rolls H, the upper feed roll being preferably covered with rubber and these feed rolls will be driven in the direction of the arrow, Fig. 1 so as to feed the feathers into the guide G and beneath the cutter head B. In front of the feed rolls H is mounted a guide plate K in which is formed the guide groove or notch $k$ to enable the feathers to be accurately delivered between the feed rolls H and insure their passing into the guide groove $g$ of the guide G. At the rear of the cutter head B are preferably provided the discharge rolls M that serve to discharge the feathers from the machine after the pithy portions of the stems have been subjected to the action of the rotary cutter head B; these rolls M being driven in the direction of the arrows Fig. 1.

The rotary cutter head B should be driven at a high rate of speed, say about four thousand two hundred revolutions per minute, while the feed rolls H and the discharge rolls M are driven at a much lower speed, say about one hundred and fifty revolutions per minute.

I have not deemed it necessary to show the gearing for the cutter head and rolls as this gearing will be of usual construction and forms no part of my invention.

From the foregoing description it will be seen that when a feather with the pithy portion of the stem upward and the quill end forward is passed through the guide groove or notch $k$ of the guide plate K and between the feed rolls H it will be forced by these feed rolls into the guide groove $g$ of the guide G and as the feather is fed into the machine with the larger or quill part first the yielding table C will be depressed so as to permit the thick part of the quill and shaft or stem to pass beneath the guide G and into position to be acted upon by the knives $b$ of the cutter head. As the narrower part of the feather stem or shaft passes under the guide G, the yielding table C will gradually and correspondingly rise and present the plume bearing part of the stem or shaft of the feather closer to the cutters so as to secure a perfect dressing at the narrower or tip end of the feathers as well as at the thicker or quill end. The yielding table C should have its upward movement so restricted that it cannot approach the cutting knives nearer than is necessary to secure the dressing or cutting away to the proper extent of the narrower or tip end of the feathers. As the pithy portion of the stems or shafts of the feathers lies on one side of the plumed portion it will be readily seen that when the feathers are passed beneath the cutter head with the pithy portion of the stems upward, this portion can be cut away so as to leave merely that part of the stems to which the plumage is attached, and this too without danger of cutting away or marring the plumed portion. After the quill end of a feather has passed a short distance beyond the cutter head B it will be caught by the discharge rolls M which will draw forward the feather as the remaining part of the stem is subjected to the action of the knives $b$.

While I prefer to employ a rotary cutter head B as above described it is manifest that my improved yielding table C and guide G may be used in conjunction with other forms of mechanism for dressing or cutting away the pithy portions of the feather stems and I do not wish this broad feature of my invention to be understood as restricted to the rotary cutter head B, nor do I wish the term rotary cutter head to be understood as restricted necessarily to a rotary cutter head provided with knives shown in the accompanying drawings.

Having thus described the invention, what I claim as new, and desire to secure by Letters Patent, is—

1. In a feather dressing machine, the combination with a suitable cutter, of a bodily yielding table opposite said cutter, means for forcing said table toward said cutter, a guide located in front of said cutter and opposite said table and provided with a groove in its face to receive the pithy portion of the feather-stem, substantially as described.

2. In a feather dressing machine the combination with a suitable cutter, of upper and lower feed rolls in front of said cutter, a yielding table with means for pressing it toward the cutter, and a guide located opposite the yielding table and intermediate the cutter and the feed rolls and having a groove to receive the pithy portion of the feather stem, substantially as described.

3. In a feather dressing machine, the combination with a suitable cutter mounted in stationary supports, of a yielding table opposite said cutter and a guide located in front of said cutter and opposite the yielding table, said guide being provided with a groove to admit the pithy portion of the feather stem, said groove having its shallowest part adjacent the cutter to determine the extent of movement of the table and the depth of cut, substantially as described.

4. In a feather dressing machine, the combination with a suitable cutter for removing the pithy portion of the feather stem, of a bodily yielding table located opposite said cutter and provided with means for pressing it normally toward the same and a guide block located in front of said cutter and provided with a groove to admit the pithy portion of the feather stem, substantially as described.

5. A feather dressing machine comprising the combination with a rotary cutter head B, of a yielding table C, the guide G, the feed rollers H, and front guide plate K having a guide groove $k$, substantially as described.

6. A feather dressing machine comprising the combination with a suitable cutter of a guide G in front of said cutter, a table or support for the feathers beneath said guide, suitable feed rolls in front of said guide F and a guide K having a groove or notch to direct the feathers, substantially as described.

7. In a feather dressing machine, the combination with a suitable cutter, of upper and lower feed rolls located in front of said cutter and a notched guide in front of said feed rolls to insure the accurate delivery of the feathers into the machine, substantially as described.

JAMES HOPPIN McCONNELL.

Witnesses:
E. C. McCONNELL,
L. A. STEVENS.